Jan. 10, 1967   H. E. TEMPLE   3,297,176
CONVEYOR MECHANISM FOR COOLING OR PROOFING ARTICLES
Filed March 27, 1964   3 Sheets-Sheet 1

INVENTOR.
HIRAM E. TEMPLE
BY
*Learman, Learman & McCulloch*
ATTORNEYS

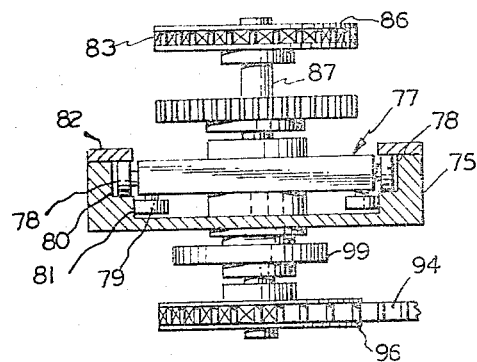
FIG.4
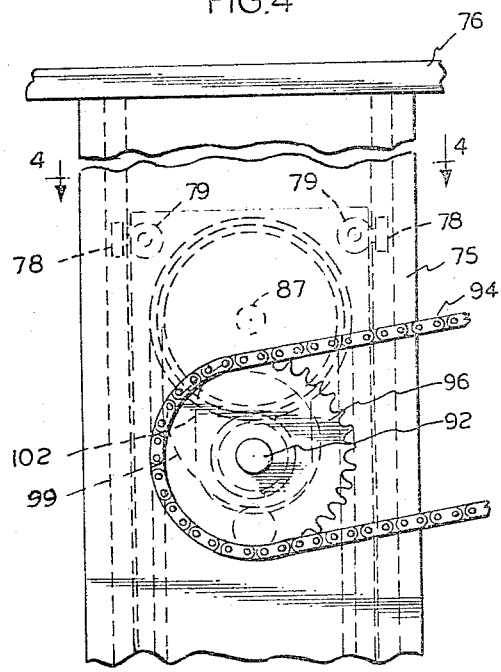
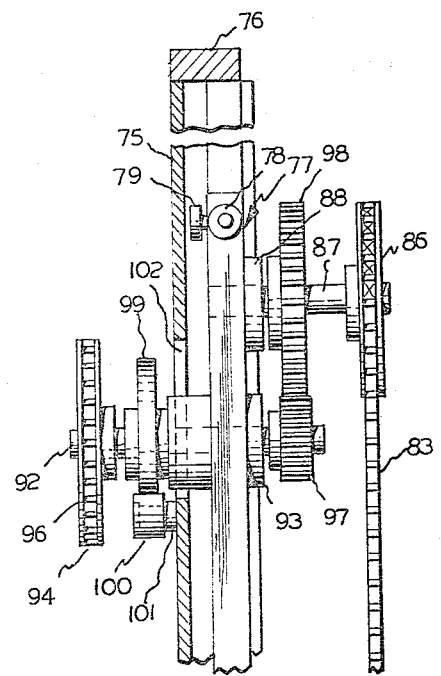
FIG.5
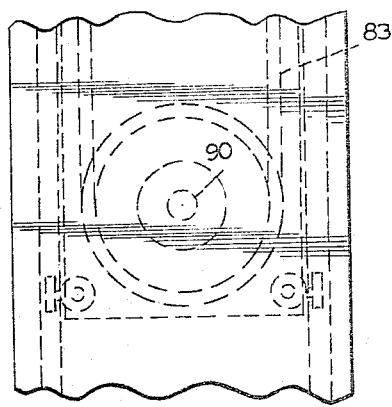
FIG.3
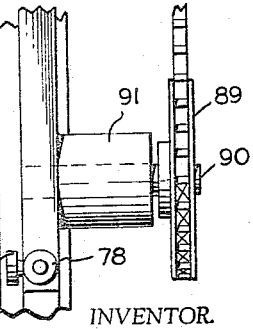
INVENTOR.
HIRAM E. TEMPLE
BY
ATTORNEYS United States Patent Office 3,297,176
Patented Jan. 10, 1967

3,297,176
CONVEYOR MECHANISM FOR COOLING
OR PROOFING ARTICLES
Hiram E. Temple, Saginaw, Mich., assignor to Baker Perkins Inc., Saginaw, Mich., a corporation of New York
Filed Mar. 27, 1964, Ser. No. 355,220
8 Claims. (Cl. 214—16.4)

This invention relates to apparatus for moving farinaceous products through a bakery proofer or cooler housing in a circuitous path to subject them for a predetermined time interval to a desired atmosphere.

More particularly, the invention relates to apparatus of the character disclosed in Temple Patent No. 2,823,811, in which a single, continuous, drive means can be employed to drive the elevator, lowerator, rack advancing conveyor, and loading and unloading elements so that complicated and expensive electrical control circuits which have been used in the past to start and stop separate motors for driving these elements need not be employed, the system incorporating mechanism which permits the shelves of the product carrying racks to be successively stopped opposite the loading and unloading conveyors for a sufficient length of time to be loaded and unloaded even though continuous drive means is employed.

One of the prime objects of the present invention is to provide apparatus of the character described which can be operated by a continuously driven single motor in a simple, efficient and inexpensive manner to thereby permit such a system to be manufactured and sold at a lower cost than previously and to be maintained more economically.

Another object of the invention is to provide apparatus of the character described incorporating rack elevating chains which are continuously driven, the system providing for movement of the sprockets around which the elevator chains are trained in a downward direction at intervals so that the travel of the elevator chains during such intervals is compensated by the movement of the sprockets downwardly and the net effect on the racks is to hold them stationary with their shelves opposite the product loading and unloading conveyors or stations for a sufficient length of time to permit horizontal loading and unloading of the shelves with conventional pusher type loading and unloading mechanisms.

A further object of the invention is to provide a system of the type described which is extremely reliable and practical in character and which has mechanically synchronized operating elements.

Other objects and advantages of the invention will be pointed out specifically or will become apparent from the following description when it is considered in conjunction with the appened claims and the accompanying drawings, in which:

FIGURE 3 is an enlarged, fragmentary, side elevational view of the upper end of the elevator mechanism at one side of the machine;

FIGURE 4 is a sectional plan view thereof, taken on the line 4—4 of FIGURE 3; and FIGURE 5 is an end elevational view thereof.

*The housing and associated structure*

Figure 1:
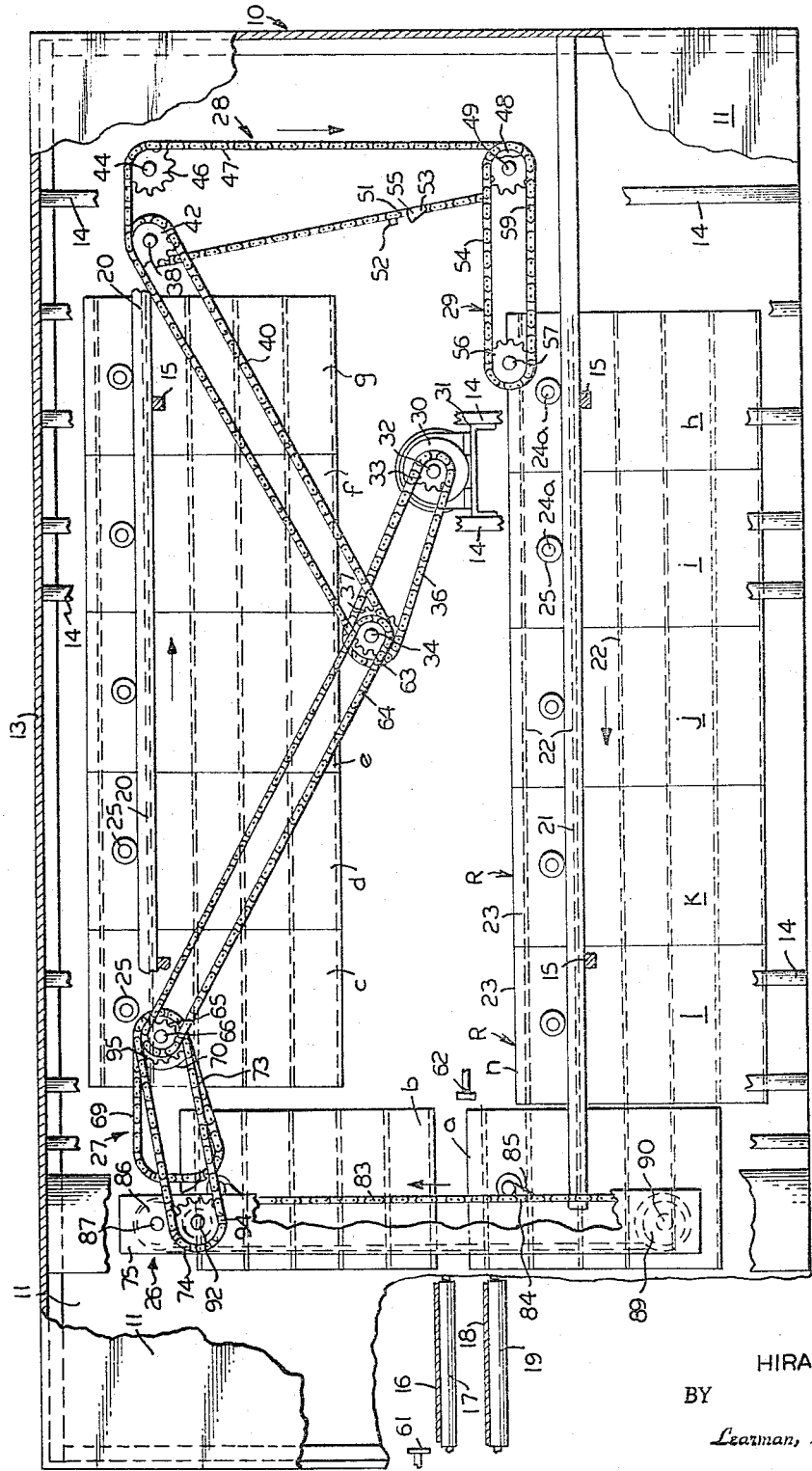
FIGURE 1 is a side elevational view of a proofer or cooler constructed in accordance with the invention and taken on the line 2—2 of FIGURE 2, the walls of the housing and certain portions of the frame being broken away to show the various operating elements, and many of the bearing and support members being omitted in the interests of clarity.

Referring now more particularly to the accompanying drawings, wherein a preferred embodiment of the invention only has been shown, a numeral 10 generally indicates an enclosure or housing which includes side walls 11, 11', end walls 12, 12', and a top wall 13, interconnected with one another by suitable means to form a cabinet supported internally by a skeleton framework including vertical and horizontal members 14 and 15, respectively. If the enclosure is to be used as a cooler, the side and end walls may be provided with suitable filter covered openings and the top wall will support a fan drawing air through the openings and circulating it through the housing. If the structure is to be used as a proofer, suitable atmosphere maintaining elements will be employed to maintain the desired humidity and temperature levels within the housing 10 in the usual manner.

Adjacent one end of the housing structure 10, at least one of the side walls (11 in FIGURE 2) will be provided with openings to admit an endless belt, product supplying conveyor 16 trained around driven rolls 17, and also an endless belt, product receiving and discharging conveyor 18 which is trained around driven rolls 19. The conveyors 16 and 18 extend in vertically spaced relation transversely into the housing 10 and define what may be termed a loading and unloading zone or station at the front end of the enclosure 10, with product support surfaces which, in the present instance, are movable transversely into and out of the housing enclosure 10.

Extending longitudinally of the housing and supported by the framework members 14 and 15 are horizontal upper and lower rails 20 and 21 at each side of the enclosure 10. The rails 20 provide an upper run or path for racks or carriers R taveling from left to right in FIGURE 1, and the rails 21 provide a lower run or path for the racks R traveling in the opposite direction. In the present instance it will be noted that each rack or shelf R includes six shelves 22 supported by side walls 23, but clearly more or fewer shelves could be provided if desired. It will be seen that the vertical space between the upper surfaces of conveyor belts 16 and 18 is the same as the vertical space between the upper surfaces of a pair of vertically adjacent shelves. Each of the material carriers or racks R is identical and a plurality of them *a–l* are shown. Secured to the sides 23 of each of the racks R are shafts 24 on which flanged wheel or roller members 25 are journaled in position to engage and travel along the pairs of upper and lower rails 20 and 21, and it will be observed that the shafts 24 include reduced ends 24*a* which project laterally beyond the rails 20 and 21.

*The drive and rack conveying mechanisms*

Figure 2:
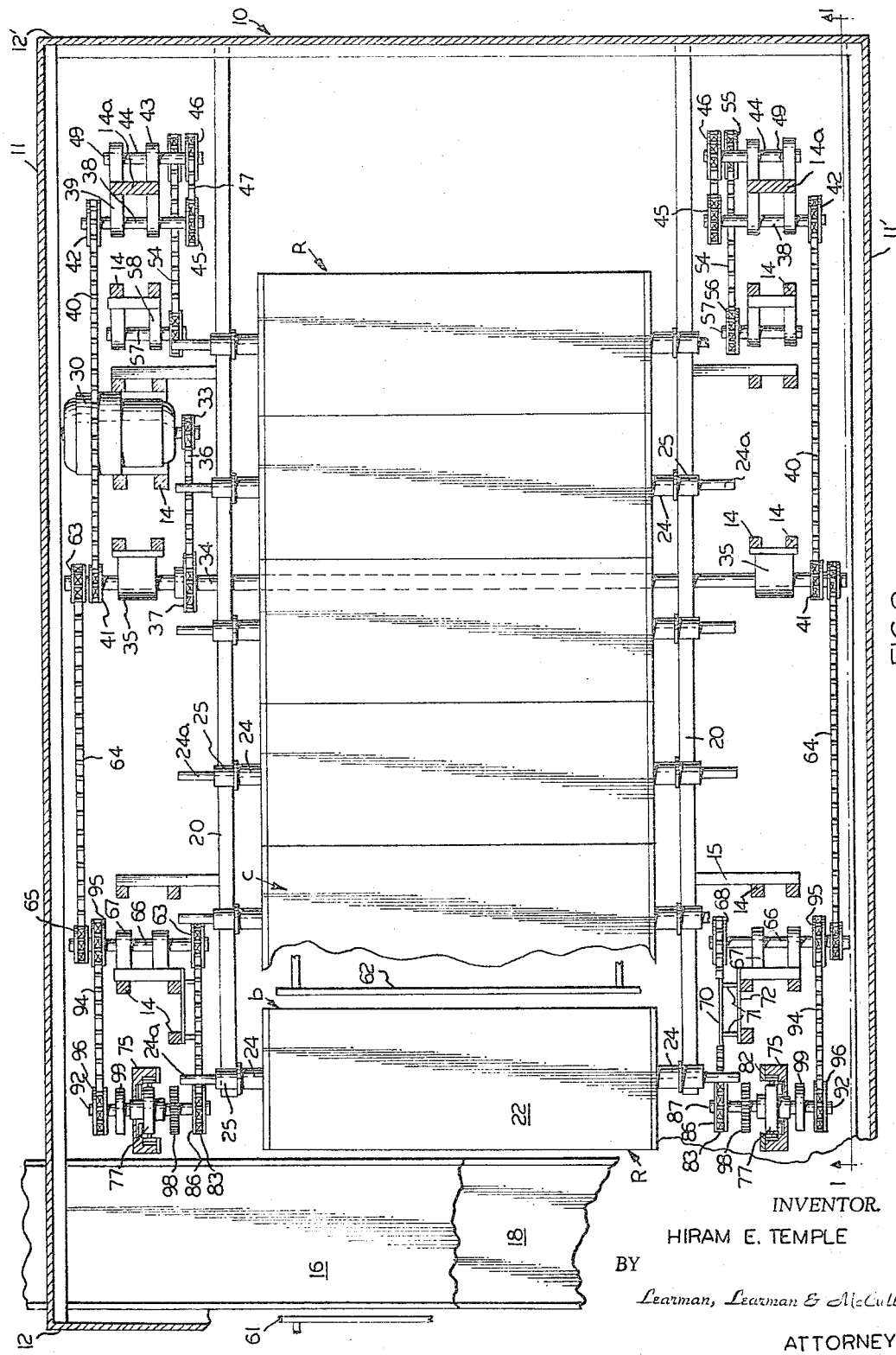
FIGURE 2 is a top plan view of the apparatus shown in FIGURE 1, with certain parts being broken away and other parts being shown fragmentarily for the sake of clarity.

The rack conveying mechanism is best disclosed in FIGURES 1 and 2 and includes an elevator mechanism generally designated 26 at the front end of the housing or enclosure 10, an upper run rack advancing conveyor mechanism generally indicated at 27, a lowerator mechanism generally indicated at 28, and a lower run rack advancing conveyor mechanism generally indicated at 29. Each of the rack conveying units 26–29 is driven by a single, continuously operating electric motor 30 which may be supported on a motor stand 31 between vertical frame members 14. The armature shaft 32 of the motor 30 mounts a sprocket 33 which drives a main drive shaft 34 which substantially spans the housing 10, as shown in FIGURE 2, the shaft 34 being journaled in bearings 35 supported on vertical frame members 14. A chain 36 trained around the motor shaft sprocket 33 is also trained around a sprocket 37 mounted on the shaft 34. The main shaft 34 drives rear jack shafts 38 journaled by bearings 39 mounted on vertical frame members 14a at each side of the housing 10 via chains 40 which are trained around sprockets 41 on the shafts 34 and 42 on the shafts 38. It will be noted that the vertical supports 14a also mount bearings 43 which journal rear stub shafts 44 at each side of the housing 10 in horizontal alignment with the shafts 38.

The lowerator mechanism 28 includes, in addition to the shafts 38 and 44, sprockets 45 and 46, respectively, mounted on these shafts, and endless chains 47 trained around the sprockets 45 and 46 at each side of the enclosure 10 and around lower sprockets 48 which are fixed on lower shafts 49 supported by similar bearings from the vertical frame support members 14a. Each chain 47 of the set of chains comprising the lowerator 28 preferably is of the sprocket link type, having a plurality of special links 50 and 51 of the character illustrated in the previously mentioned Temple patent arranged at spaced intervals along the length of the chains. Each link 51 includes a projecting portion 52, whereas each link 50 comprises a generally segment-shaped element pivoted as at 53 to an adjacent chain link so as to be swingable through an arc. The manner in which these members 52 and 50 cooperate with lowerator guides (not shown) to effectively support a rack while it is being lowered is well described in the patent mentioned and will not be repeated. The extending shaft portions 24a on the racks R are supported between the projecting portions 52 and pivotal links 50 during the descent of a rack on the lowerator chains 47 in the usual manner.

The lower rack advancing mechanism 29 includes a set of chains 54, one on each side of the enclosure 10, which are trained around sprockets 55 mounted on the shafts 49. The chains 54 are also trained around sprockets 56 which are fixed on shafts 57 journaled in bearings 58 mounted on other vertical frame members 14. Provided on each of the chains 54, which are also conventional sprocket link chains, is a special link 59 having a rack shaft engaging lug 60. The lugs 60 on the lower rack advancing chains 54 travel around to engage the projecting shaft ends 24a of a rack R which has been deposited on the lower rails 21 by the lowerator chains 47 and operate to transport it forwardly when a rack, in the position of rack a in FIGURE 1, has moved upwardly a sufficient distance to leave a space into which another rack may be moved.

The main shaft 34 may also be used to simultaneously drive the rack loading pusher 61 and the rack unloading pusher 62. A suitable mechanism for driving these pusher elements 61 and 62 is illustrated in Gibbons Patent No. 2,931,483 and incorporated herein by reference, and it will be well understood by those skilled in the art that the Gibbons drive elements can be readily mounted on the shaft 34 or on shaft elements which are driven therefrom. Also driven from the main shaft 34 by means of sprockets 63 mounted on the ends thereof are chains 64 which are trained at their front ends around sprockets 65 mounted on front jack shafts 66 which are journaled by bearings 67 supported on other vertical frame members 14.

The upper rack advancing conveyor 27 includes pulleys 68 mounted on the shafts 66 around which the advancing chains 69, which are also conventional chains of the sprocket link type, are trained. The chains 69 also are trained around fixed chain guide plates 70 which, as shown in FIGURE 2, can be supported by braces 71 from a support bracket 72 which mounts on vertical framework members 14. Each of the upper rack conveyor chains 69 includes a special link 73 having a projecting lug 74 adapted to engage under one of the projecting shaft ends 24a of a rack R to move it upwardly the last vertical increment to the level of the upper surfaces of the rails 20 and thence to move the racks on the rails 20 rearwardly when a rack on the lowerator mechanism 28 has been lowered sufficiently to leave a space for a rack to be pushed into place.

The elevator mechanism

As shown particularly in FIGURES 3–5, the elevator mechanism 26 comprises a pair of side frame members 75 which can be supported in vertically fixed relation in the housing 10 by suitable longitudinally disposed brace members 76, forming part of the housing skeleton framework mentioned, which connect with vertically extending framework members 14. Supported for vertical reciprocating travel by the side frame members 75 on each side of the enclosure 10 are elevator slides, generally designated 77, which include roller members 78 at the ends of each slide 77 and roller members 79 at the one side of each slide 77, which travel on guide surfaces 80 and 81, respectively, provided on the fixed elevator mechanism supports 75. It will be noted that slide retainer strips 82 (FIGURE 4) are mounted on the vertical support members 75 and are also engaged by the rollers 78.

The elevator lift chains 83, which are similarly conventional sprocket link type chains having, at spaced intervals, special links 84 mounting projecting rack engaging lugs 85, are supported on each side of the housing 10 by the vertical slide members 77. At their upper ends, each chain 83 is trained around a sprocket 86 mounted on a stub shaft 87 journaled in a bearing 88 provided on a slide 77, and at their lower ends each chain 83 is trained around a sprocket 89 mounted on a shaft 90 which is journaled by a bearing 91 fixed on the vertical slide 77.

Each slide 77 also journals a shaft 92 which is journaled in a bearing 93 provided on each slide 77. The shafts 92 are driven from the shafts 66 by chains 94 which are trained around a sprocket 95 on each shaft 66 and sprocket 96 on each shaft 92. In turn, each shaft 92 drives one of the upper elevator chain support shafts 87 through a gear 97 keyed to each shaft 92 which is in mesh with a gear 98 keyed on each shaft 87. Also mounted on each shaft 92 is a cam 99 and each cam 99 is supported in engagement with a cam follower roller 100 mounted in vertically fixed position on a shaft 101 carried by each side frame member 75. The weight of each slide 77 assures continuous engagement of the cams 99 with the rollers 100. To permit relative movement of the slides 77 and side frame members 75, openings 102 (FIGURE 5) are provided in the side walls of the stationary elevator frame members 75.

Operation

In operation, it will be assumed that the proofer or cooler is operating with a full complement of racks R in the closed loop and while the proofer or cooler is in operation, the motor 30 runs continuously, and the elevator lift chains 83, upper rack advancing chains 69, lowerator chains 47, and lower rack advancing chains 54, similarly are driven continuously and at carefully chosen speeds relative to the spacing of the rack engaging lugs thereon so that the circuitous travel of the racks in the enclosure 10 is properly accomplished. With the loading surface 16 and product discharging surface 18 being vertically fixed, the racks R are to be indexed upwardly a shelf at a time to dispose their shelves 22 opposite the surfaces 16 and 18 and the shelves 22 are to remain stationary for a sufficient length of time for the pusher 61 to push products onto the adjacent rack shelf 22 and the pusher 62 to push products on the adjacent rack shelf 22 to the discharging surface 18.

Since the elevator chains 83 travel continuously, the racks R being moved upwardly thereon would normally travel continuously upwardly, but because loading and unloading of the products cannot be satisfactorily accomplished in this manner if the surfaces 16 and 18 are to be vertically stationary, a system has been devised for cancelling or compensating for the lifting effect which the elevator chains 83 normally have. This cancelling effect is accomplished by the cams 99 which at intervals permit the slides 77 to descend at the same rate of speed as the chains 83 normally would lift the racks R, so that the resultant motion of the racks R during an interval when shelves 22 are horizontally adjacent the surfaces 16 and 18 is substantially zero. Thus, each time a rack is moved upwardly by the chains 83 one shelf space, the slides 77 are permitted to descend by the cams 99 so that the rack remains stationary to accomplish loading and unloading. Because the products must be handled gently, particularly if the apparatus is used as a proofer and proofed dough is being handled, the cams 99 are so configured that the acceleration of a rack from a stationary position is gradual and its de-acceleration to arrive at a position horizontally opposite one of the surfaces 16 or 18 is also gradual. Further, the speed of travel of the racks upwardly when upward motion is permitted is increased because the slides 77 are moving upwardly to increase the lifting effect of the chains 83.

In this manner, the racks a and b in FIGURE 1 will be indexed upwardly a shelf at a time. By the time the rack b has been indexed upwardly a distance such that it is almost in horizontal alignment with the rack c, the lugs 74 on the upper advancing conveyor chain 69 will engage the terminal ends 24a of the rack shafts and move them upwardly to the level of the ends 24a of the racks c–g. At this time the lugs 74 will move the rack b horizontally until it occupies the position occupied by the rack c in FIGURE 1. At this time the rack g will be moved to the right, in position to be engaged by the lowering lug means 52 on the lowerator chains 28. By the time the rack a has ascended in indexing steps to a position in which it clears the adjacent rack n, the lugs 60 will have been brought around on the chains 54 to engage the terminal ends 24a of the shafts 24 projecting from the rack h to move the whole lower row of racks to the left and dispose the rack l in position to be immediately engaged by one of the lugs 85 on each of the elevator chains 83. This occurs during the time the pushers 61 and 62 are operating.

It is not necessary that the system operate with a full complement of racks R, and it should be understood that the various driving chains could be so synchronized with respect to placement of the rack engaging lugs thereon and their relative speeds of travel that a rack could be omitted. Also, additional racks may be included by simply lengthening the entire apparatus, and the capacity could be further increased by employing racks R with a greater number of shelves 22. Preferably, the motor 30 will drive the system through a speed varying device which will permit the length of time the racks travel in the complete circuit to be varied in accordance with the treatment time desired for the particular product being processed.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

I claim:

1. Product proofing or cooling apparatus comprising: frame means; rails defining upper and lower generally longitudinally extending article supporting runs supported thereon; elevator frame means supported on said frame means; vertically movable elevator slide means supported by said elevator frame means; endless elevator conveyor means mounted on said slide means having a generally vertically disposed run substantially connecting the front ends of said rails; lowerator conveyor means connecting the rear ends of said rails; carriers with vertically spaced shelves; means on said endless elevator conveyor means and lowerator conveyor means for engagement and disengagement with said carriers successively to lift and lower the carriers vertically from one rail to the other in a circuitous travel; vertically stationary loader surface means adjacent said elevator run for supporting products to be loaded on said shelves of the carriers; vertically stationary unloading surface means adjacent said elevator run for supporting products to be unloaded from said carrier shelves successively; drive means; connecting means driven continuously by said drive means and connected with said endless elevator conveyor means for moving said elevator run continuously; means at predetermined intervals moving said elevator slide means downwardly at the speed of travel of said run to cancel the lifting effect of said run on said carriers and at intervals hold the shelves of the carriers stationarily adjacent the loader and unloading surfaces for short periods of time sufficient to permit loading and unloading; and means for loading products from said loader surface to said shelves and unloading products from said shelves to said unloading surface during said periods of time.

2. The combination defined in claim 1 in which said means moving said elevator slide means comprises cam means reacting between said slide means and elevator frame means.

3. The combination defined in claim 1 in which said connecting means driven continuously by said drive means includes shaft means carried by said slide means; means thereon connected to drive said elevator run; cam means on said shaft means; cam follower means on said elevator frame means under said cam means; and means flexibly connecting said shaft means and drive means for transmitting a continuous drive to said shaft means in various vertical positions of said slide means.

4. The combination defined in claim 3 in which said endless elevator conveyor means includes an upper and a lower sprocket connected by a chain; and said means on said elevator conveyor means for engagement and disengagement with said carriers comprises spaced apart lugs on said chain.

5. Product cooling or proofing apparatus comprising: vertically spaced rails defining upper and lower article supporting runs; conveyor means, including elevator conveyor means having a generally vertically disposed run substantially connecting the ends of said rails, and lowerator conveyor means having a generally vertically disposed run substantially connecting opposite ends of said rails to complete a circuit; carriers with vertically spaced shelves supported on said rails and elevator and lowerator means; laterally extending lug means on said elevator conveyor means and lowerator conveyor means maintained laterally extended therefrom as the elevator and lowerator conveyor means travel vertically to engage and support a carrier and move it from one rail to another and there disengage from it; said conveyor means also including generally horizontally extending runs with lug means thereon for engagement and disengagement with said carriers for moving them in end-to-end engagement along said rails; the lug means on the elevator and lowerator means and generally horizontally extending runs being spaced and driven at speed such that the carriers are moved around the circuit; loader surface means adjacent one of said elevator and lowerator runs for supporting products to be loaded on said shelves of the carriers; unloading surface means adjacent said one of said runs for supporting products to be unloaded from said carrier shelves successively; drive means; connecting means driven continuously by said drive means and connected with one of said elevator and lowerator conveyor means for moving said one of said runs and the carriers elevated thereon vertically past said loader surface and unloading surface; means operative at predetermined time intervals substantially canceling the effect of the continuous vertical movement of said one of said runs so that the carriers being elevated on said run are moved in indexing movements to dispose shelves of the carriers successively stationarily adjacent the loader and unloading surfaces for short periods of time sufficient to permit loading and unloading; and means for loading products from said loader surface to said shelves and unloading products from said shelves to said unloading surface during said periods of time.

6. Product cooling or proofing apparatus comprising: an enclosure; pairs of upper and lower rails defining upper and lower generally longitudinally extending article supporting runs; a pair of endless elevator conveyor elements in the front end of said enclosure having a pair of generally vertically disposed runs substantially connecting the front ends of said rails; means mounting said elevator conveyor elements for vertical travel; lowerator conveyor means connecting the rear ends of said rails; carriers with vertically spaced shelves; lug means on said elevator conveyor elements for engagement and disengagement with said carriers successively to move the carriers vertically from the lower rails to the upper rails; vertically stationary loader surface means adjacent said elevator runs for supporting products to be loaded on said shelves of the carriers; vertically stationary unloading surface means adjacent said elevator runs for supporting products to be unloaded from said carrier shelves successively; drive means; connecting means driven continuously by said drive means and connected with said elevator conveyor elements for moving said elevator elements continuously; means incorporated with said connecting means driving said means mounting said elevator conveyor elements vertically downwardly at the speed of travel of said elements so that the carriers engaged thereon are elevated in indexing movements to dispose shelves of the carriers stationarily adjacent the loader and unloading surfaces for short periods of time sufficient to permit loading and unloading; and means for loading products from said loader surface to said shelves and unloading products from said shelves to said unloading surface during said periods of time.

7. Product cooling or proofing apparatus comprising: rails defining upper and lower generally longitudinally extending article supporting runs; endless elevator conveyor means having a generally vertically disposed run substantially connecting certain ends of said rails; means mounting said elevator conveyor means for vertical reciprocating travel; lowerator conveyor means connecting the other ends of said rails; carriers with vertically spaced shelves; means on said elevator conveyor means and lowerator conveyor means for engagement and disengagement with said carriers successively to move the carriers vertically from one rail to the other in a circuitous travel; loader surface means adjacent said elevator run for supporting products to be loaded on said shelves of the carriers; unloading surface means adjacent said elevator run for supporting products to be unloaded from said carrier shelves successively; drive means; connecting means driven continuously by said drive means and connected with said elevator conveyor means for driving said elevator run continuously; means incorporated with said connecting means driving said means mounting said elevator means for reciprocatory travel vertically downwardly at intervals to compensate for the vertical travel of said elevator run and the carriers engaged thereon at intervals so that the carriers are elevated in indexing movements to dispose shelves of the carriers stationarily adjacent the loader and unloading surfaces for short periods of time sufficient to permit loading and unloading; and means for loading products from said loader surface to said shelves and unloading products from said shelves to said unloading surface during said periods of time.

8. Material handling apparatus comprising: conveyor means forming a loop circuit and including elevator conveyor means having a generally vertically disposed, vertically traveling portion; carriers with vertically spaced shelves; spaced apart means on said elevator conveyor portion for engagement with said carriers to lift them; vertically stationary loader surface means adjacent said elevator portion for supporting products to be loaded on said shelves of the carriers; vertically stationary unloading surface means adjacent said elevator portion for supporting products to be unloaded from said carrier shelves successively; drive means; connecting means driven continuously by said drive means and connected with said elevator conveyor means for moving said elevator portion continuously; means incorporated with said connecting means for canceling the effect of the movement of said vertical portion on said carriers at predetermined intervals and moving said carriers in indexing movements to dispose shelves of the carriers stationarily adjacent the loader and unloading surfaces for short periods of time sufficient to permit loading and unloading; and means for loading products from said loader surface to said shelves and unloading products from said shelves to said unloading surface during said periods of time.

References Cited by the Examiner

UNITED STATES PATENTS

| 1,116,406 | 11/1914 | Fleischer | 198—110 X |
| 1,837,605 | 12/1931 | Baker | 198—85 |
| 2,358,507 | 9/1944 | Haberstump | 198—158 X |
| 2,823,811 | 2/1958 | Temple | 214—16.4 |
| 3,160,261 | 12/1964 | Ferro | 198—85 |

FOREIGN PATENTS 524,099 7/1940 Great Britain.

GERALD M. FORLENZA, *Primary Examiner.*

R. B. JOHNSON, *Assistant Examiner.*